(12) United States Patent
Kabe et al.

(10) Patent No.: US 8,045,071 B2
(45) Date of Patent: Oct. 25, 2011

(54) LIQUID CRYSTAL APPARATUS

(75) Inventors: Masaaki Kabe, Kanagawa (JP); Koji Noguchi, Kanagawa (JP); Hideaki Tsuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 370 days.

(21) Appl. No.: 12/355,294

(22) Filed: Jan. 16, 2009

(65) Prior Publication Data

US 2009/0195717 A1    Aug. 6, 2009

(30) Foreign Application Priority Data

Jan. 31, 2008  (JP) .................................. 2008-021782

(51) Int. Cl.
  *G02F 1/133*  (2006.01)
  *G02F 1/1343*  (2006.01)

(52) U.S. Cl. ............. 349/33; 349/141; 349/94; 349/110

(58) Field of Classification Search .................. 349/141, 349/94, 110, 113, 123, 130, 132, 134, 136, 349/139, 142, 143, 33
See application file for complete search history.

(56) References Cited

U.S. PATENT DOCUMENTS

| 6,583,840 B1 * | 6/2003 | Inoue et al. .................... 349/141 |
| 7,199,852 B1 * | 4/2007 | Lu et al. ......................... 349/141 |
| 7,414,690 B1 * | 8/2008 | Lu et al. ......................... 349/141 |
| 2003/0039770 A1 * | 2/2003 | Sato et al. ....................... 428/1.3 |
| 2009/0195717 A1 * | 8/2009 | Kabe et al. ....................... 349/33 |

FOREIGN PATENT DOCUMENTS

JP    2005-338264    12/2005

\* cited by examiner

*Primary Examiner* — Brian Healy
(74) *Attorney, Agent, or Firm* — SNR Denton US LLP (57) ABSTRACT

Disclosed herein is a liquid crystal apparatus, including, a pair of substrates; and a liquid crystal layer held between the substrates, the liquid crystal layer having positive dielectric anisotropy, the liquid crystal of the liquid crystal layer exhibiting, when no voltage is applied thereto, an orientation direction parallel to a transverse electric field which is generated when a voltage is applied to the liquid crystal layer.

20 Claims, 11 Drawing Sheets

LIQUID CRYSTAL APPARATUS

CROSS REFERENCES TO RELATED APPLICATIONS

The present invention contains subject matter related to Japanese Patent Application JP 2008-021782 filed in the Japan Patent Office on Jan. 31, 2008, the entire contents of which being incorporated herein by reference.

BACKGROUND OF THE INVENTION

1. Field of the Invention

This invention relates to a liquid crystal apparatus and typically to a liquid crystal display apparatus for use as a display unit, and more particularly to a liquid crystal display apparatus which operates in a light scattering mode.

2. Description of the Related Art

Various liquid crystal modes are available such as a TN (Twisted Nematic) mode, a VA (vertical alignment) mode which uses vertical orientation and an IPS (In-Plane-Switching) mode and an FFS (Fringe Field Switching) mode wherein switching is carried out within a substrate plane. Scattering type liquid crystal is a mode wherein switching is carried out between a light scattering state and a no-light scattering state or transmission state. Research and development of such scattering type liquid crystal are proceeding energetically because the scattering type liquid crystal generally requires no polarizing plate and can achieve brighter display than the aforementioned liquid crystal modes which essentially require a polarizing plate.

Generally, high molecular dispersion type liquid crystal is used as the scattering types liquid crystal. A principle of the high molecular dispersion type liquid crystal is described with reference to FIGS. 1A and 1B. The high molecular dispersion type liquid crystal apparatus includes a pair of glass substrates 1, a pair of ITO (Indium Tin Oxide) electrodes 2, polymer 3, and liquid crystal molecules 4. In fabrication, liquid crystal to which monomer is added is injected into a cell which has electrodes at upper and lower portions thereof, and then ultraviolet rays are irradiated to cause phase separation of the liquid crystal and the high molecules. Thereupon, the liquid crystal is placed into small balls, which are surrounded by the polymerized high molecules.

Figure 1A:
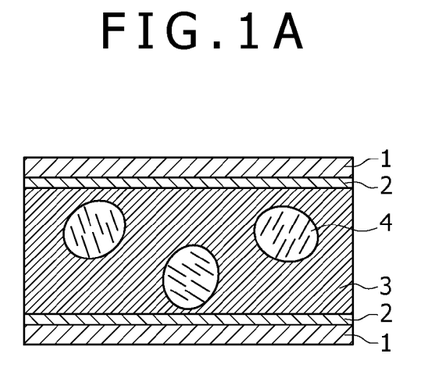
FIG. 1A is a schematic view illustrating a state of high molecular scattering type liquid crystal when no voltage is applied and FIG. 1B is a similar view but illustrating another state of the high molecular scattering type liquid crystal when a voltage is applied.
Figure 1B:
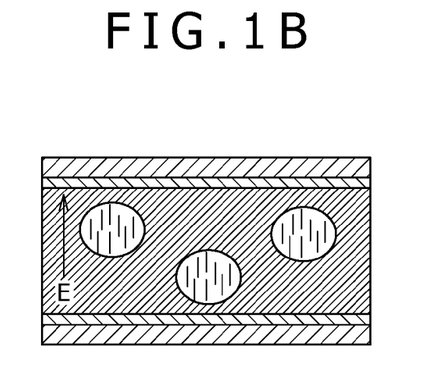

In a state wherein no voltage is applied, the liquid crystal molecules in the small balls are directed at random and the average refractive index of the liquid crystal is different from the high molecules around the small balls. Therefore, light is scattered by the liquid crystal as shown in FIG. 1A. On the other hand, when a voltage is applied, where the liquid crystal has the positive dielectric anisotropy, the major axis of the liquid crystal is oriented so as to be parallel to the electric field E as shown in FIG. 1B. At this time, if the liquid crystal is made of a material with which the refractive index of the liquid crystal in the minor axis direction is substantially equal to the refractive index of the surrounding high molecules, then the light is not scattered by but is transmitted through the liquid crystal. This is the principle of the high molecule scattering type liquid crystal.

Also scattering type liquid crystal which uses dynamic scattering is available. In the scattering type liquid crystal just described, liquid crystal generally having negative dielectric anisotropy and ions are injected in an element having electrodes at upper and lower portions thereof. If a high voltage is applied to the element described, then turbulent flows are produced in the liquid crystal, and light is scattered by the liquid crystal (dynamic scattering).

A liquid crystal display apparatus in the past frequently adopt a vertical electric field system wherein a voltage is applied in a thicknesswise direction or vertical direction of the liquid crystal. In contrast, in recent years, attention is attracted to a liquid crystal display apparatus which adopts the transverse electric field method. This is the IPS mode or the FFS mode wherein switching is carried out within a plane of a substrate and is disclosed, for example, in Japanese Patent Laid-Open No. 2005-338264. The liquid crystal display apparatus of the transverse electric field type includes a pair of substrates, liquid crystal held in a gap between the substrates, electrodes formed on one of the substrates, and driving means for applying a transverse electric field along the planar direction of the substrate to the liquid crystal through the electrodes. In the liquid crystal display apparatus, the orientation state of the liquid crystal is controlled through the transverse electric field to carry out display. In comparison with the liquid crystal display apparatus of the vertical electric field type, the liquid crystal display apparatus of the transverse electric field type is characterized in that it has a large angular field of view and exhibits a high contrast and attracts attention as a display unit for a portable apparatus.

Figure 2A:
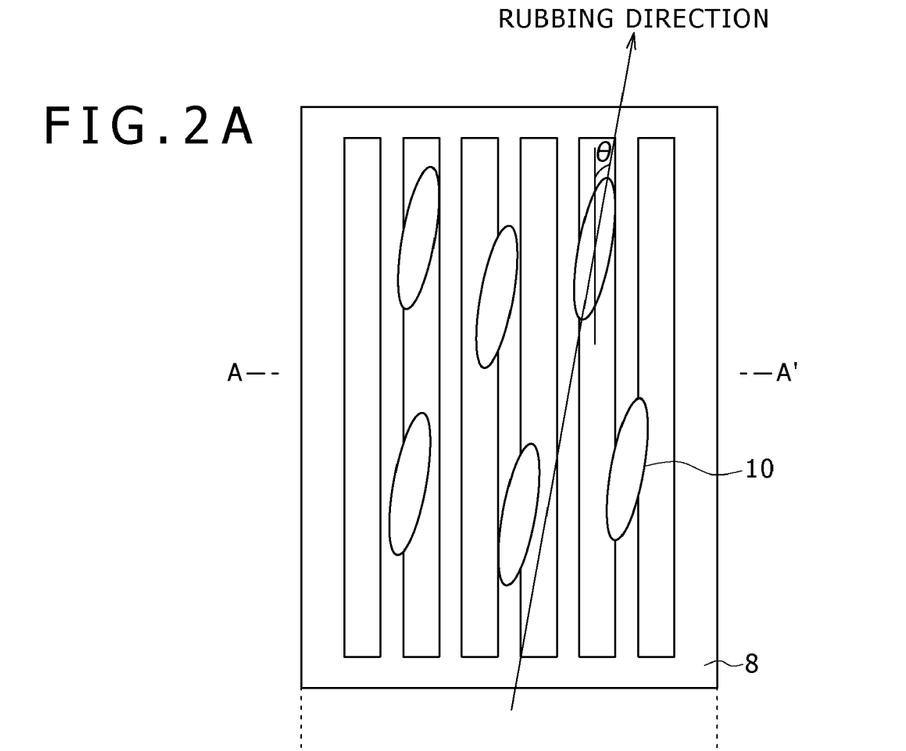
FIGS. 2A and 2B are a plan view and a cross sectional view showing a popular FFS mode, respectively.
Figure 2B:
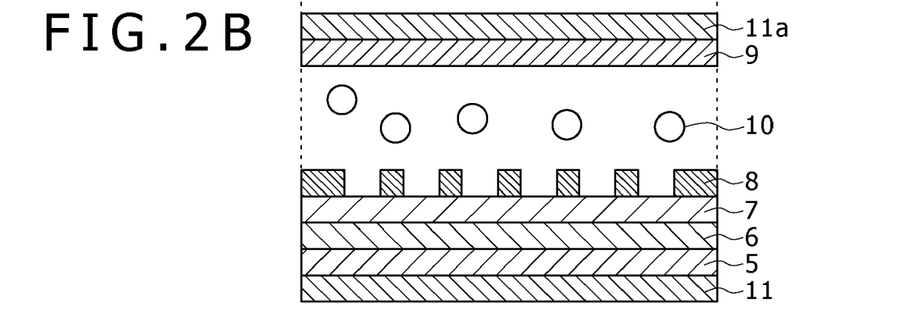

The transverse electric field mode is described with reference to a plan view of FIG. 2A and a sectional view of FIG. 2B. In the transverse electric field mode, a common electrode 6 is provided commonly on a driving substrate 5, and a pixel electrode 8 is formed in a comb-shaped pattern on the common electrode 6 with an insulating film 7 interposed therebetween, and an orientation film not shown is provided in such a manner as to cover over the pixel electrode 8. A liquid crystal layer 10 is held between the orientation film on the driving substrate 5 side and another orientation film not shown of an opposing substrate 9. A pair of polarizing plates 11 and 11a are disposed in a crossed Nicol relationship with the substrates interposed therebetween. Here, the rubbing direction of the orientation film on the driving substrate side and the rubbing direction of the orientation film on the opposing substrate side, that is, the orientation direction of the liquid crystal, coincides with the transmission axis of one of the two polarizing plates. Further, where the dielectric anisotropy of the liquid crystal layer is positive, the rubbing direction and the extending direction of the pixel electrode are substantially parallel to each other. Actually, the rubbing direction and the extending direction of the pixel electrode define therebetween an angle $\theta$ such that the direction in which the liquid crystal rotates when a voltage is applied thereto may be controlled.

In the transverse electric field mode having such a configuration as described above, when no voltage is applied between the common electrode and the pixel electrode, the orientation direction of the liquid crystal molecules which form the liquid crystal layer is perpendicular to the transmission axis of one of the polarizing plate but parallel to the transmission axis of the other polarizing plate. Consequently, the pixel displays the black. On the other hand, if a voltage is applied between the common electrode and the pixel electrode, then the orientation direction of the liquid crystal molecules is rotated to an oblique direction with respect to the extending direction of the pixel electrode by a transverse electric field or fringe field generated between the pixel electrodes. Consequently, light transmitted through the liquid crystal layer is provided with a rotated polarization state and therefore is transmitted through the opposing side polarizing plate, resulting in display of the white. The transverse electric field mode described above is called fringe field switching mode or FFS mode. As another one of transverse electric field modes, for example, an IPS mode is known.

SUMMARY OF THE INVENTION

The scattering type liquid crystal mode described above is disadvantageous in that it generally requires a high voltage of several tens volt. Further, since high molecules are dispersed, the scattering type liquid crystal mode is inferior in reliability to an ordinary liquid crystal mode. Further, the scattering type liquid crystal mode is disadvantageous also in that the transmission factor thereof when the voltage is gradually raised and the transmission factor thereof when the voltage is gradually lowered are different from each other, that is, the scattering type liquid crystal mode has a hysteresis. Also regarding the dynamic scattering mode, the driving voltage is generally as high as several tens volt and high power consumption is required because current flows. Further, since ions are added, the reliability of the scattering type liquid crystal mode is not very high.

Therefore, it is desirable to provide a quite novel scattering type liquid crystal apparatus which uses a transverse electric field and can be driven by a reduced voltage.

According to an embodiment of the present invention, there is provided a liquid crystal apparatus including a pair of substrates joined together with a predetermined gap left therebetween, a liquid crystal layer held in the gap, and an electrode formed on at least one of the substrates for applying an electric field in a direction parallel to the substrate, the liquid crystal of the liquid crystal layer exhibiting, when no voltage is applied thereto, an orientation direction parallel to a transverse electric field which is generated when a voltage is applied to the liquid crystal layer. Typically, according to the present invention, there is provided a liquid crystal apparatus including a pair of substrates, and a liquid crystal layer held between the substrates, the liquid crystal layer having positive dielectric anisotropy, It is to be noted here that the term "parallel" does not necessarily signify a statistically strict parallel state but has an allowance within which an effect which can be exhibited by the present invention can be exhibited.

As described in the description of the related art, in an ordinary transverse electric field mode, where the liquid crystal has positive dielectric anisotropy, the orientation direction of the liquid crystal when no voltage is applied is parallel to the extending direction of the pixel electrode. In other words, the orientation direction of the liquid crystal when no voltage is applied is perpendicular to the direction of a transverse electric field generated when a voltage is applied. If the orientation direction of liquid crystal when no voltage is applied is perpendicular to the extending direction of the pixel electrode as in embodiments of the present invention, that is, if the orientation direction is parallel to the direction of the transverse electric field generated when a voltage is applied, then when a voltage is applied, the liquid crystal does not rotate. Therefore, it is considered that such a liquid crystal apparatus as described above is not used normally. However, it was found for the first time that, where the element configuration of the present invention is applied, a state wherein the liquid crystal scatters light strongly when a voltage is applied thereto is obtained. Consequently, scattering type liquid crystal which can be driven by a lower voltage can be achieved.

In the liquid crystal apparatus, the transverse electric field may be a fringe field. With the liquid crystal apparatus, the liquid crystal layer scatters light with a higher degree of certainty.

In this instance, the liquid crystal apparatus may be configured such that a common electrode and a comb-shaped pixel electrode are disposed in an isolated relationship from each other on that face of at least one of the substrates which is positioned adjacent to the liquid crystal layer so as to generate a fringe field, and the orientation direction of the liquid crystal when no voltage is applied is perpendicular to an extending direction of the comb-shaped pixel electrode. In the liquid crystal apparatus, a fringe field is generated with certainty, and when a voltage is applied, the liquid crystal layer scatters light. It is to be noted here that the term "perpendicular" does not necessarily signify a statistically strict perpendicular state but has an allowance within which an effect which can be exhibited by embodiments of the present invention can be exhibited.

In this instance, the common electrode may have a light reflecting property or a low light reflecting property. With the liquid crystal apparatus, since the common electrode has a light reflecting property or a low light reflecting property, there is no necessity to newly produce a light reflecting member or a low light reflecting member. Consequently, reduction of the number of steps can be anticipated.

Preferably, the liquid crystal apparatus further includes a light reflecting plate or a low light reflecting plate or black plate disposed on that face of one of the substrates which is remote from the liquid crystal layer. Where the light reflecting plate is disposed, when no voltage is applied, light inputted from the outside is regularly reflected by the light reflecting plate. Therefore, a substantially black state is established. When a voltage is applied, light is scattered by the liquid crystal layer, and consequently, a white state is established. On the other hand, where the low light reflecting plate is disposed, when no voltage is applied, light inputted from the outside is absorbed by the low light reflecting plate, and therefore, a black state is established. On the other hand, when a voltage is applied, light is scattered by the liquid crystal layer, and consequently, a white state is established. In this manner, liquid crystal of the reflection type which does not use a polarizing plate can be achieved.

Or, the liquid crystal apparatus may further include a light reflecting member or a black member disposed on that face of one of the substrates which is adjacent to the liquid crystal layer. In this instance, since the light reflecting body or the low light reflecting member or black member is disposed in the inside of the substrates, there is no necessity to dispose the light reflecting plate or the low light reflecting plate externally of the substrates. Consequently, reduction in thickness can be anticipated.

According to another embodiment of the present invention, there is provided a liquid crystal apparatus including a pair of substrates, and a liquid crystal layer held between the substrates, the liquid crystal layer having positive dielectric anisotropy, the liquid crystal layer having at least two orientation directions of the liquid crystal in one pixel, the liquid crystal of the liquid crystal layer exhibiting, in each of the regions in which the liquid crystal layer exhibits the orientation directions, when no voltage is applied thereto, an orientation direction parallel to a transverse electric field which is generated when a voltage is applied to the liquid crystal layer. The liquid crystal apparatus may be configured such that a common electrode and a comb-shaped pixel electrode having at least two extending directions are disposed in an isolated relationship from each other on that face of at least one of the substrates which is positioned adjacent to the liquid crystal layer so as to generate a fringe field, and the orientation directions, which individually correspond to the extending directions, of the liquid crystal in the regions when no voltage is applied to the liquid crystal in the regions being perpendicular to the extending directions of the comb-shaped pixel electrode. It is to be noted here that the term "perpendicular" does not necessarily signify a statistically strict perpendicular state but has an allowance within which an effect which can be exhibited by embodiments of the present invention can be exhibited.

In summary, where the liquid crystal apparatus includes a pair of substrates, and a liquid crystal layer held between the substrates, the liquid crystal layer having positive dielectric anisotropy, the liquid crystal of the liquid crystal layer exhibiting, when no voltage is applied thereto, an orientation direction parallel to a transverse electric field which is generated when a voltage is applied to the liquid crystal layer, a light scattering type liquid crystal mode of a lower voltage than ever can be implemented. Further, where the transverse electric field is a fringe field, light is scattered with a higher degree of certainty. A liquid crystal apparatus having such a configuration as just described is useful as a display apparatus or can be applied also to such an application like a privacy film which is placed into a light scattering state so that the opposite side cannot be visually observed therethrough.

Where the liquid crystal apparatus is configured such that a common electrode and a comb-shaped pixel electrode are disposed in an isolated relationship from each other on that face of at least one of the substrates which is positioned adjacent to the liquid crystal layer, and the orientation direction of the liquid crystal when no voltage is applied is perpendicular to an extending direction of the comb-shaped pixel electrode, light scattering type liquid crystal which can scatter light with certainty can be implemented.

Further, where the liquid crystal apparatus includes a pair of substrates, and a liquid crystal layer held between the substrates, the liquid crystal layer having positive dielectric anisotropy, the liquid crystal layer having at least two orientation directions of the liquid crystal in one pixel, the liquid crystal of the liquid crystal layer exhibiting, in each of the regions in which the liquid crystal layer exhibits the orientation directions, when no voltage is applied thereto, an orientation direction parallel to a transverse electric field which is generated when a voltage is applied to the liquid crystal layer, the direction dependency of the scattering strength when a voltage is applied can be reduced.

The above and other objects, features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENTS

Figure 3:
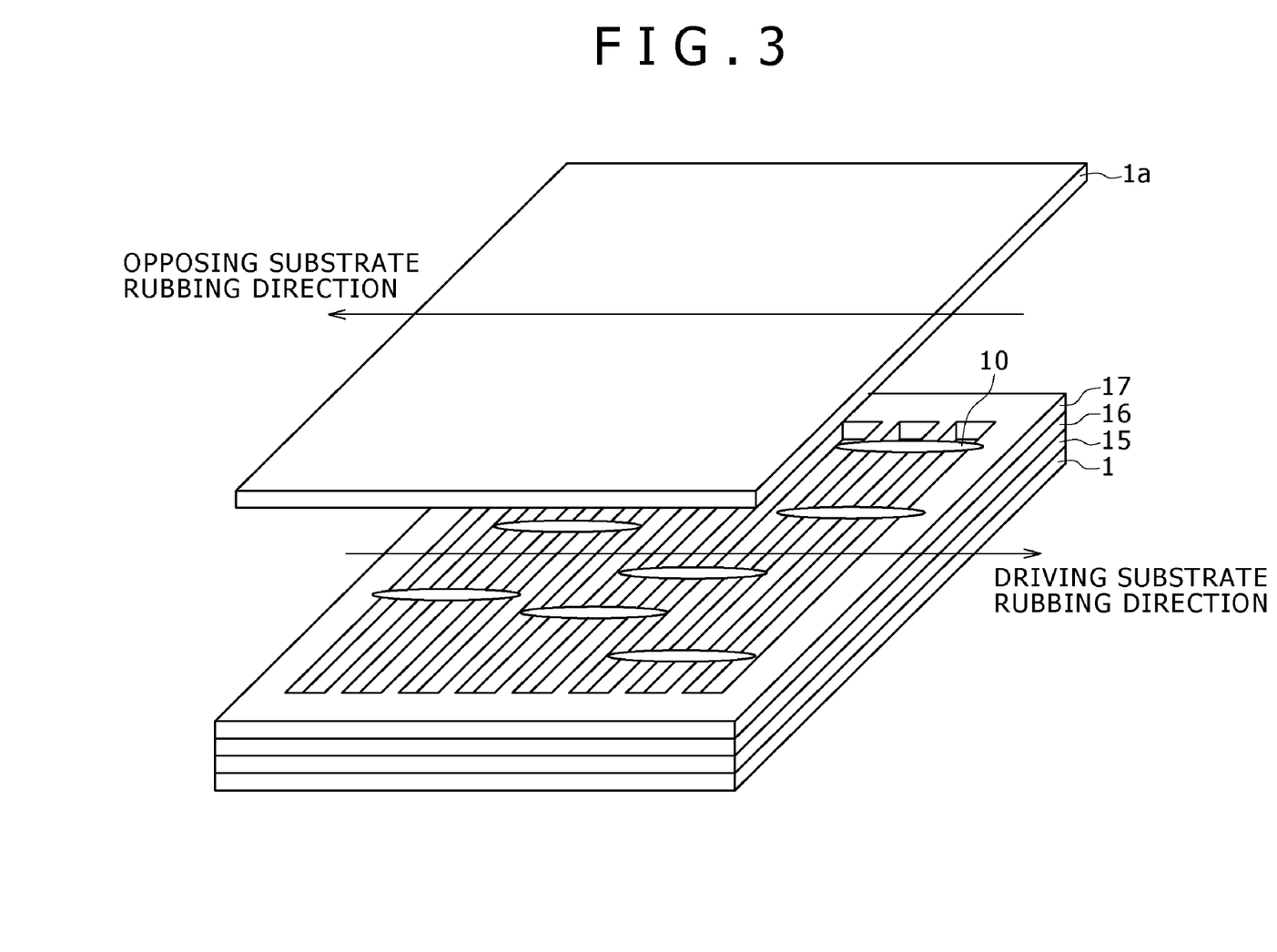
FIG. 3 is a schematic perspective view of a liquid crystal display apparatus used in a first embodiment of the present invention.

In the following, embodiments of the present invention is described with reference to the accompanying drawings. A first embodiment of the present invention is described first. In particular, a driving substrate side of a liquid crystal display apparatus used in the first embodiment of the present invention is described with reference to FIG. 3. An ITO electrode 15 serving as a common electrode is formed over an overall area of a glass substrate 1 by sputtering. On the ITO electrode 15, SiNx is formed as an insulating film 16, and a pixel electrode 17 of ITO patterned in a comb shape by photolithography is formed on the insulating film 16. The comb-shaped electrode is formed in Line/space=3 μm/3 μm. An orientation film not shown is applied to and formed on the pixel electrode 17. In the present embodiment, SE7492 by Nissan Chemical Industries, Ltd. was used for the orientation film. As seen in FIG. 3, the orientation film has a rubbed surface rubbed in a direction perpendicular to the extending direction, that is, the longitudinal direction of the comb-tooth-shaped electrode portions.

Now, an opposing electrode 1a is described with reference to FIG. 3. An orientation film is formed by application on the opposing electrode 1a and has a rubbed face. SE7492 by Nissan Chemical Industries, Ltd. was used for the orientation film. This is a polyimide-based orientation film material.

The glass substrate 1 and the opposing electrode 1a are adhered to each other such that the orientation films thereof are opposed to each other and the rubbing direction of the glass substrate 1 and the rubbing direction of the opposing electrode 1a are anti-parallel rubbing directions to each other as seen in FIG. 3. A suitable amount of a spacer agent is spread between the driving substrate and the opposing substrate so that the gap between the substrates may be kept fixed. The spacer diameter is adjusted so that the gap may have a dimension of 3 μm. In the gap, liquid crystal having positive dielectric anisotropy is injected by an injection step. As the liquid crystal material, MLC-7021-100 by Merck Ltd. Japan having positive dielectric anisotropy was used. At this time, the orientation of the liquid crystal when no voltage is applied is the rubbed direction, that is, a perpendicular direction to the extending direction or longitudinal direction of the comb-tooth-shaped electrode portions. If a voltage is applied between the common electrode and the pixel electrode of the liquid crystal display apparatus having such a configuration as described above, then the fringe field generated, that is, the transverse electric field generated, is directed to the perpendicular direction to the extending direction of the comb-tooth-shaped electrode portions.

Figure 4:
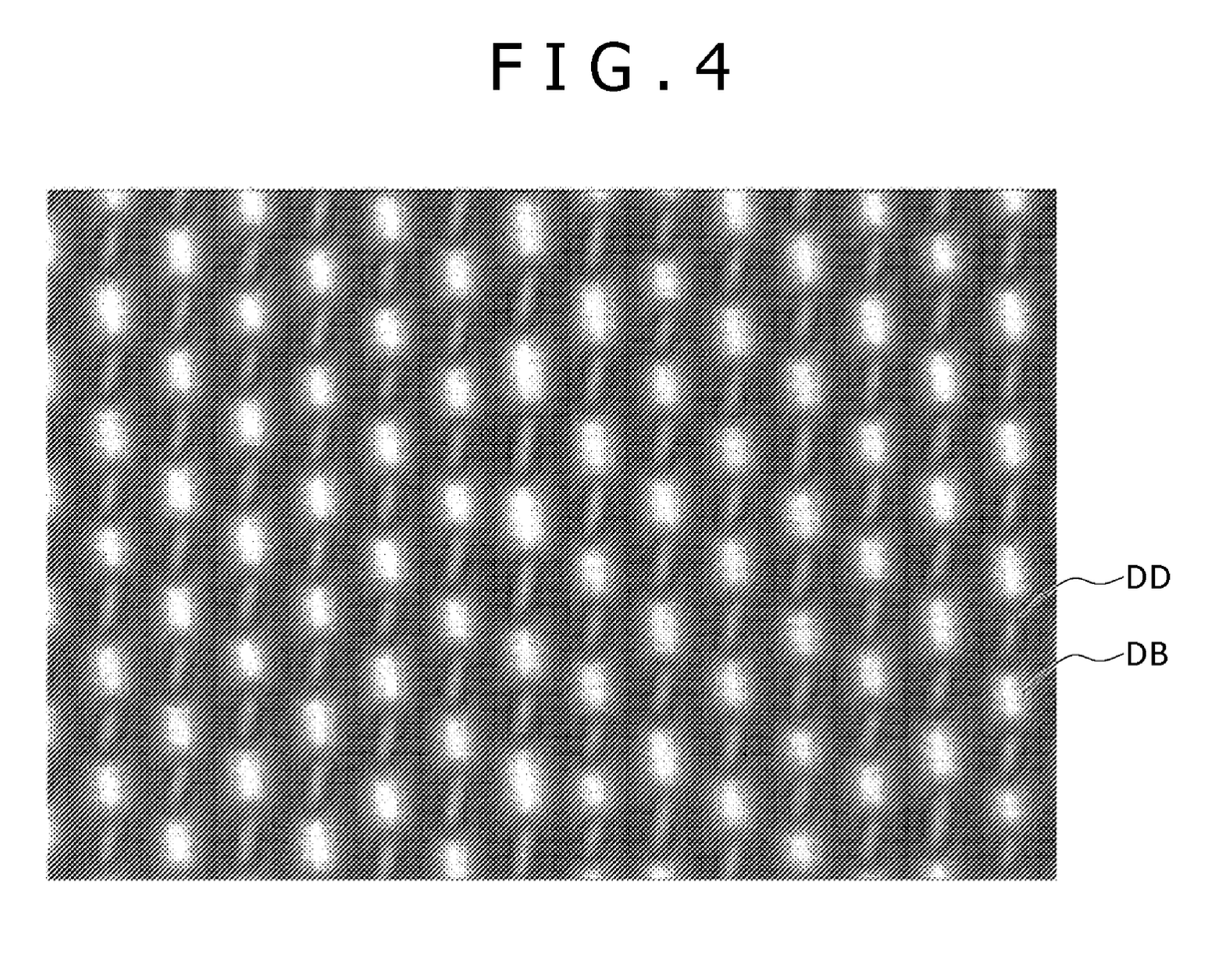
FIG. 4 is a view showing a microphotograph illustrating a light scattering state of a liquid crystal display apparatus according to an embodiment of the present invention in an enlarged scale.

A manner of the texture of the liquid crystal when an alternating rectangular wave of 60 Hz was applied with an amplitude of 10 V between the common electrode and the pixel electrode of the liquid crystal display apparatus is described in detail below. In order to facilitate observation, the liquid crystal display apparatus was inserted between polarizing plates disposed in crossed Nicol arrangement, and microscope observation was conducted in a state wherein the angle defined by the transmission axis of one of the polarizing plates and the rubbing direction was 20 degrees. A microphotograph is shown in FIG. 4. As seen in FIG. 4, the texture of the liquid crystal is such that domains DD which have a definite boundary and are comparatively dark in the inside of the boundary thereof and domains DB which have an indefinite boundary and are comparatively light in the inside of the boundary thereof are arranged alternately and comparatively regularly.

Figure 5A:
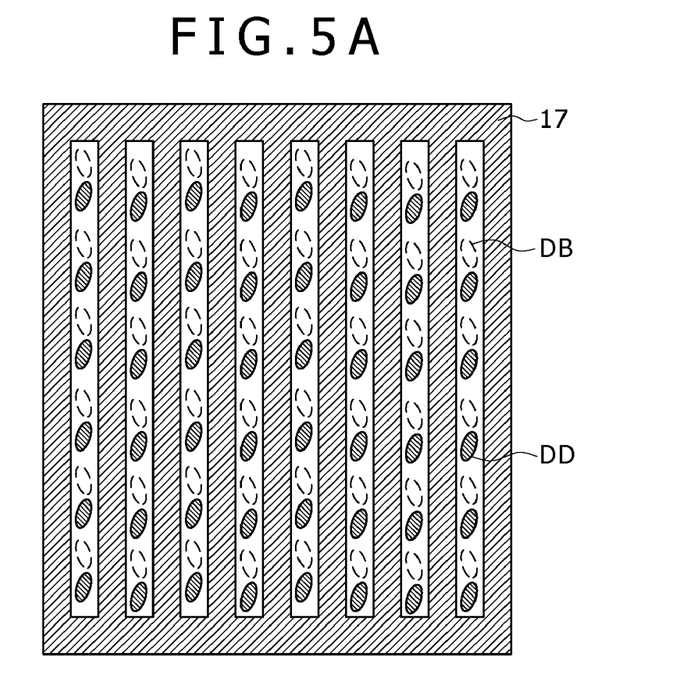
FIG. 5A is a schematic view showing a result of observation by a polarizing microscope when the application voltage in the liquid crystal display apparatus used in the first embodiment is 6 V.
Figure 5B:
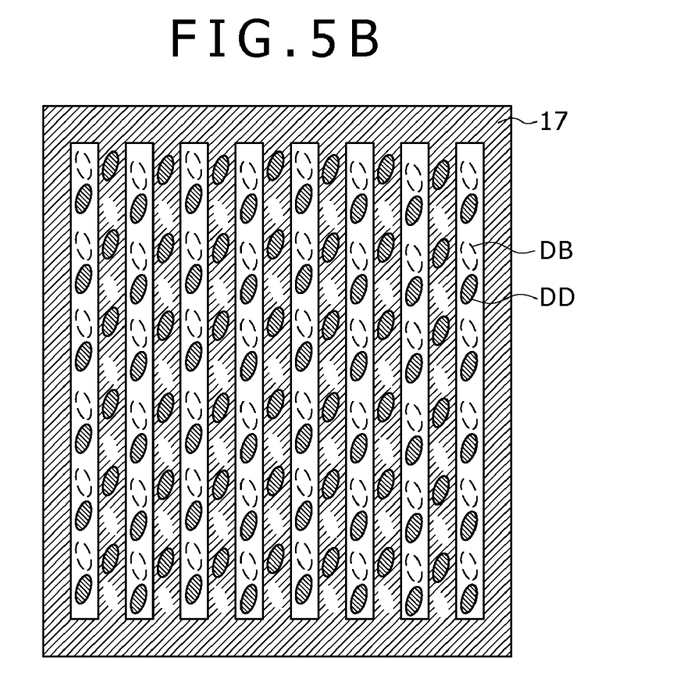
FIG. 5B is a similar view but showing a result of observation by the polarizing microscope when the application voltage in the liquid crystal display apparatus in the first embodiment is 7 V.
Figure 6A:
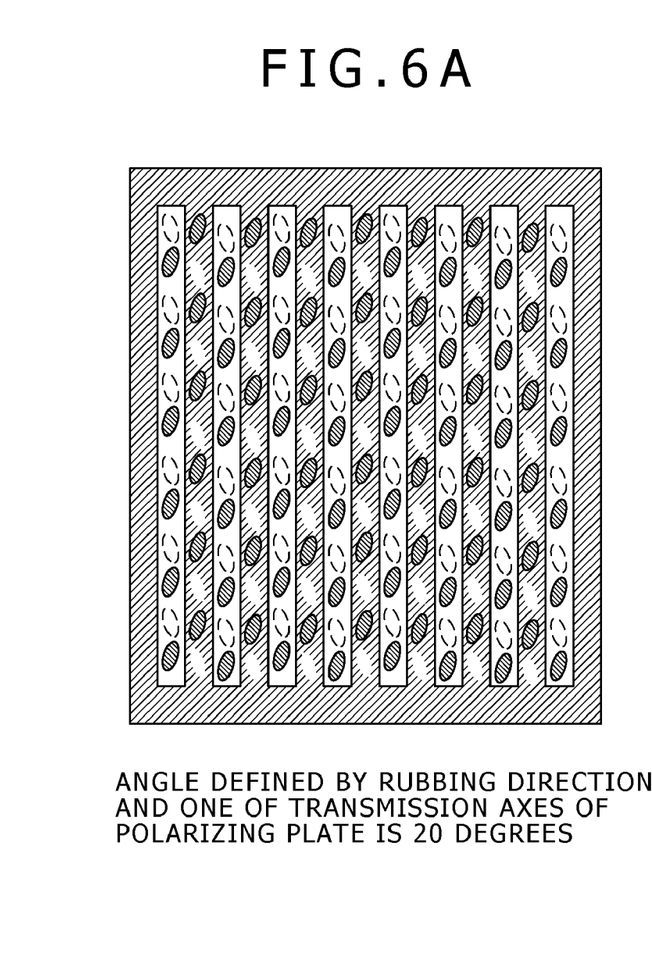
FIGS. 6A and 6B are schematic views showing results of observation by the polarizing microscope when the angle defined by a rubbing direction and the transmission axis of a polarizing plate in the liquid crystal display apparatus used in the first embodiment is 20 degrees and −20 degrees, respectively.
Figure 6B:
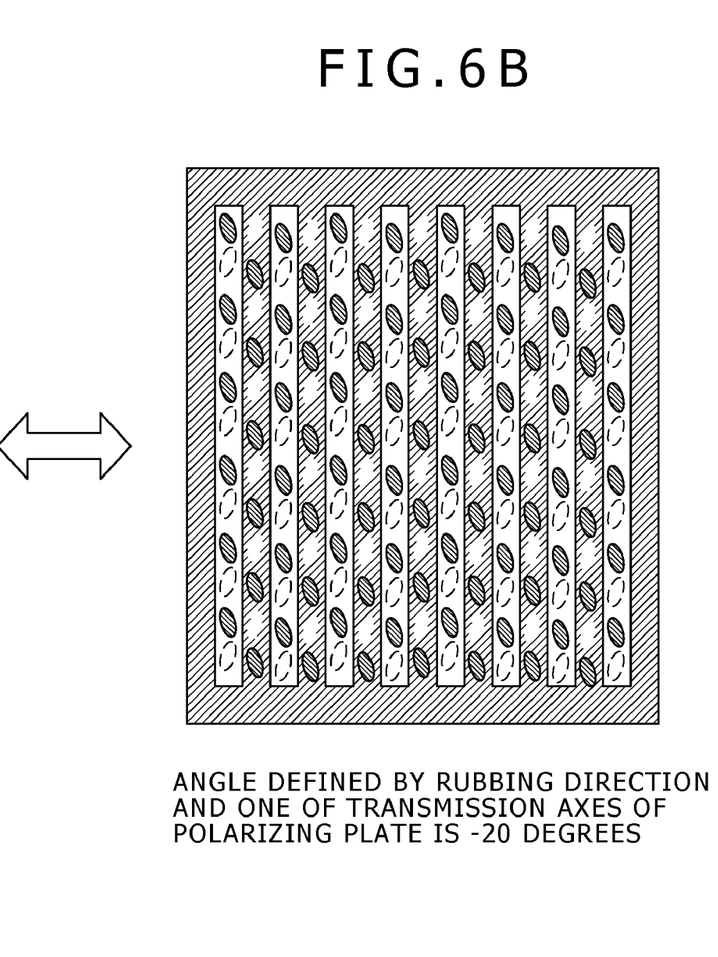

The texture of the liquid crystal is described in more detail with reference to FIGS. 5A to 6B. No significant variation was found when the amplitude of the application voltage increased to 5 V. When the amplitude was 6 V, such domains as seen in FIG. 5A began to appear between adjacent ITO portions or comb-tooth-shaped portions of the comb-shaped electrode. In the domains, domains DD "which have a definite boundary and are comparatively dark in the inside of the boundary thereof" and domains DB "which have an indefinite boundary and are comparatively light in the inside of the boundary thereof" appeared alternately along each comb tooth. Further, when the amplitude was 7 V, similar domains began to appear also on the ITO portions or comb-tooth-shaped portions of the comb-shaped electrode as seen in FIG. 5B. Thereafter, when the amplitude was increased to 10 V, although no conspicuous variation appeared, the scattering light intensity increased. It was found that, where such minute domains appear, the boundary in refractive index is produced between domains and scatters light strongly.

Then, in order to investigate what orientation the domains had, microscope observation was conducted in a state wherein the angle defined by the rubbing direction and the polarizing plate was −20 degrees. It was found that those domains DD "which have had a definite boundary" changed into domains DB "which have an indefinite boundary" and those domains DB "which have had an indefinite boundary" changed into domains DD "which have a definite boundary" as seen FIGS. 6A and 6B. From this phenomenon and the fact that light is transmitted also with the cross Nicol arrangement, it is estimated that the those domains DD "which have a definite boundary" and the domains DB "which have an indefinite boundary" have twisted orientation states wherein they are twisted in the opposite directions to each other.

As described in the description of the related art hereinabove, in an ordinary transverse electric field mode, if the dielectric anisotropy of liquid crystal is positive, then the orientation direction of the liquid crystal when no voltage is applied is substantially parallel to the extending direction of the pixel electrode. In other words, the orientation direction is substantially perpendicular to the direction of the transverse electric field generated when a voltage is applied. If the orientation direction of liquid crystal when no voltage is applied is perpendicular to the extending direction of the pixel electrode as in the present invention, that is, if the orientation direction is parallel to the direction of the transverse electric field generated when a voltage is applied, then when a voltage is applied, the liquid crystal does not rotate. Therefore, it is considered that such a liquid crystal apparatus as described above is not used normally. However, it was found for the first time that, where the element configuration of the present invention is applied, a state wherein the liquid crystal scatters light strongly when a voltage is applied thereto is obtained. Consequently, scattering type liquid crystal which can be driven by a lower voltage can be achieved.

Figure 7:
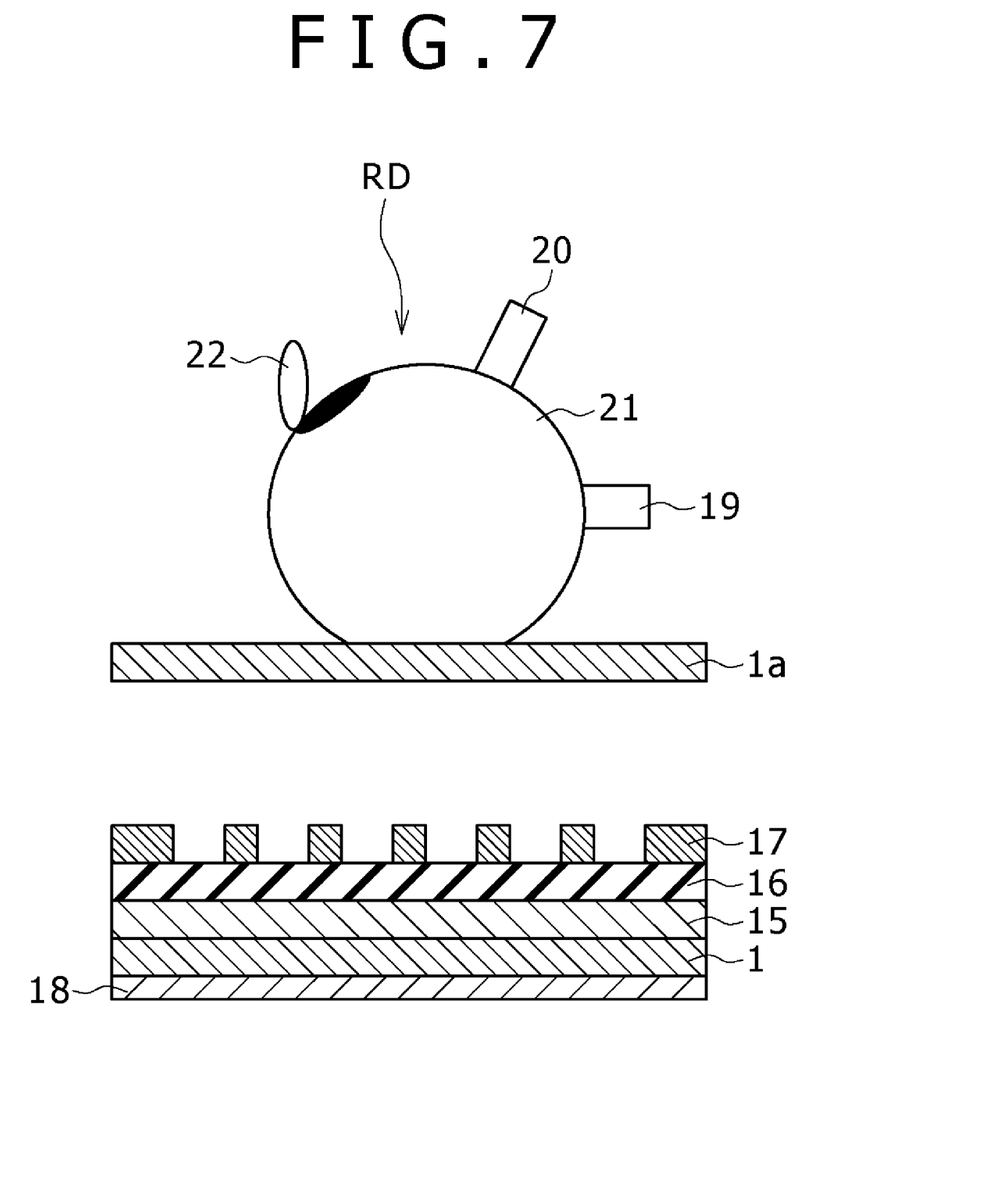
FIG. 7 is a schematic view of a liquid crystal display apparatus used in a second embodiment and a third embodiment when the reflection factor of diffuse light is measured using diffuse light.

Now, a second embodiment of the present invention is described. The second embodiment includes a combination of a mirror face plate or light reflecting plate with the liquid crystal display apparatus or liquid crystal panel of the first embodiment. Referring to FIG. 7, a mirror face plate 18 formed by sputtering Al over an overall area of a glass substrate was disposed on the side on which the liquid crystal display apparatus used in the first embodiment did not contact with the liquid crystal layer, and the scattering reflection factor was measured using a spectrocolorimeter RD. For the spectrocolorimeter RD, CM2002 by Minolta was used, and the scattering reflection factor when the voltage was applied was measured. The spectrocolorimeter RD includes a light emitting port 19, a light receiving element 20, an integrating sphere 21, and a hatch 22 for allowing discharge of regular reflection components. The measurement was carried out in a state wherein the hatch 22 of the spectrocolorimeter RD was kept open so that regular reflection components was able to be discharged.

Figure 8:
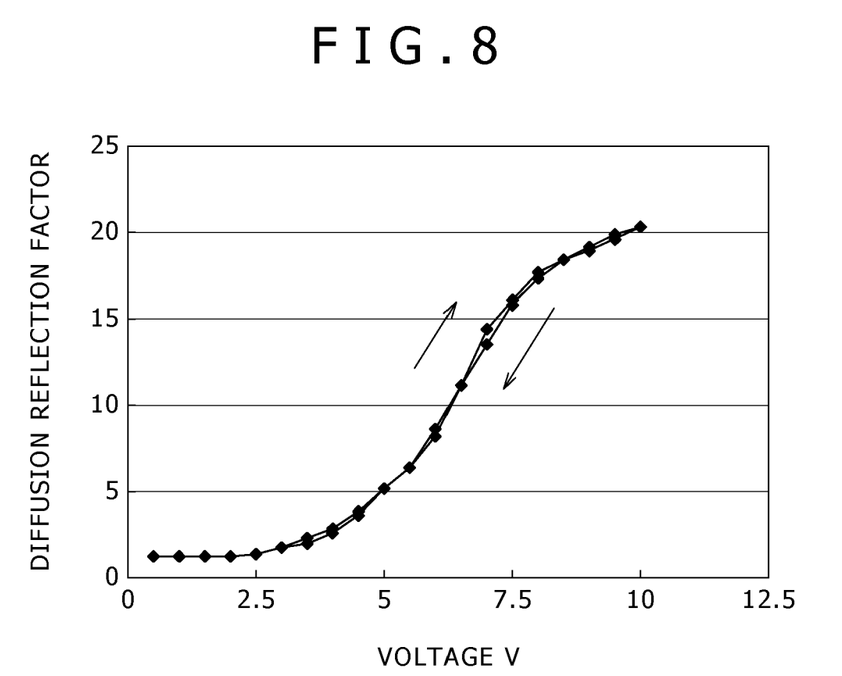
FIG. 8 is a graph illustrating a result of measurement of the diffuse reflection factor when the voltage is gradually raised and lowered in the liquid crystal display apparatus used in the second embodiment.

A result at this time is illustrated in FIG. 8. As seen in FIG. 8, where the application voltage was 10 V, the scattering reflection factor was 20 and a contrast 16 was achieved successfully. Further, there is little difference in scattering reflection factor depending upon whether the voltage was gradually raised or dropped, and it was confirmed that no hysteresis is found. In this manner, a reflection type liquid crystal display apparatus of the scattering type which uses a low voltage in a state wherein no polarizing plate is used was implemented. It is to be noted that the value of the scattering reflection factor represents a ratio where the reflection factor of a perfect white plate is represented by 100.

Now, a third embodiment is described. The third embodiment is a modification to but is different from the second embodiment in that a low reflecting plate or black plate formed by sputtering chromium and chromium oxide on a glass substrate is used in place of the mirror face plate 18. The low reflecting plate has a light absorbing property and exhibits the black color. Similarly as in the second embodiment, the spectrocolorimeter CM2002 by Minolta was used to measure the scattering reflection factor when the voltage was applied. At this time, where the amplitude of the voltage was 10 V, the scattering reflection factor was 7 and the contrast was 9, and the values are lower than those in the second embodiment. This is because, while, in the second embodiment, the reflection factor was high and consequently the contrast was high because light scattered forwardly by the liquid crystal layer was reflected by the mirror face plate, where the low reflecting plate was placed, the light scattered forwardly was absorbed by the low reflection plate. As a result, the reflection factor decreased and also the contrast decreased. However, where the mirror face plate was used as in the second embodiment, in the case of black display, unexpected appearance of something therearound in a photograph occurs. However, where the low reflecting plate is placed, there is an advantage that the drawback just described is eliminated.

Now, an forth embodiment is described. The forth embodiment is a modification to but is different from the liquid crystal display apparatus used in the first embodiment in that the common electrode is formed from an AG metal film. Except this, the liquid crystal display apparatus used in the forth embodiment is similar to that used in the first embodiment. Where such a device configuration as just described was adopted, the reflection type liquid crystal display apparatus was successfully formed with a thickness reduced from that of the liquid crystal display apparatus used in the second embodiment without externally installing a mirror face plate. In particular, the common electrode formed from an Ag metal plate is a substitute for an externally provided mirror face plate. In the liquid crystal display apparatus, a light reflecting member is disposed on a face of one of substrates which is adjacent the liquid crystal.

Now, a fifth embodiment is described. In the fifth embodiment, the liquid crystal display apparatus used in the first embodiment was modified such that the common electrode was formed from multiple layers of chromium and chromium oxide. Except this, the liquid crystal display apparatus used in the fifth embodiment is similar to that used in the first embodiment. Where such a device configuration as just described was adopted, the reflection type liquid crystal display apparatus was successfully formed with a thickness reduced from that of the liquid crystal display apparatus used in the third embodiment without externally installing a low reflecting plate. In particular, the common electrode of a low reflection property formed from multiple layers of chromium and chromium oxide substitutes an externally provided black plate. In the liquid crystal display apparatus, a black plate is disposed on a face of one of a pair of substitutes which is adjacent to the liquid crystal layer.

Figure 9:
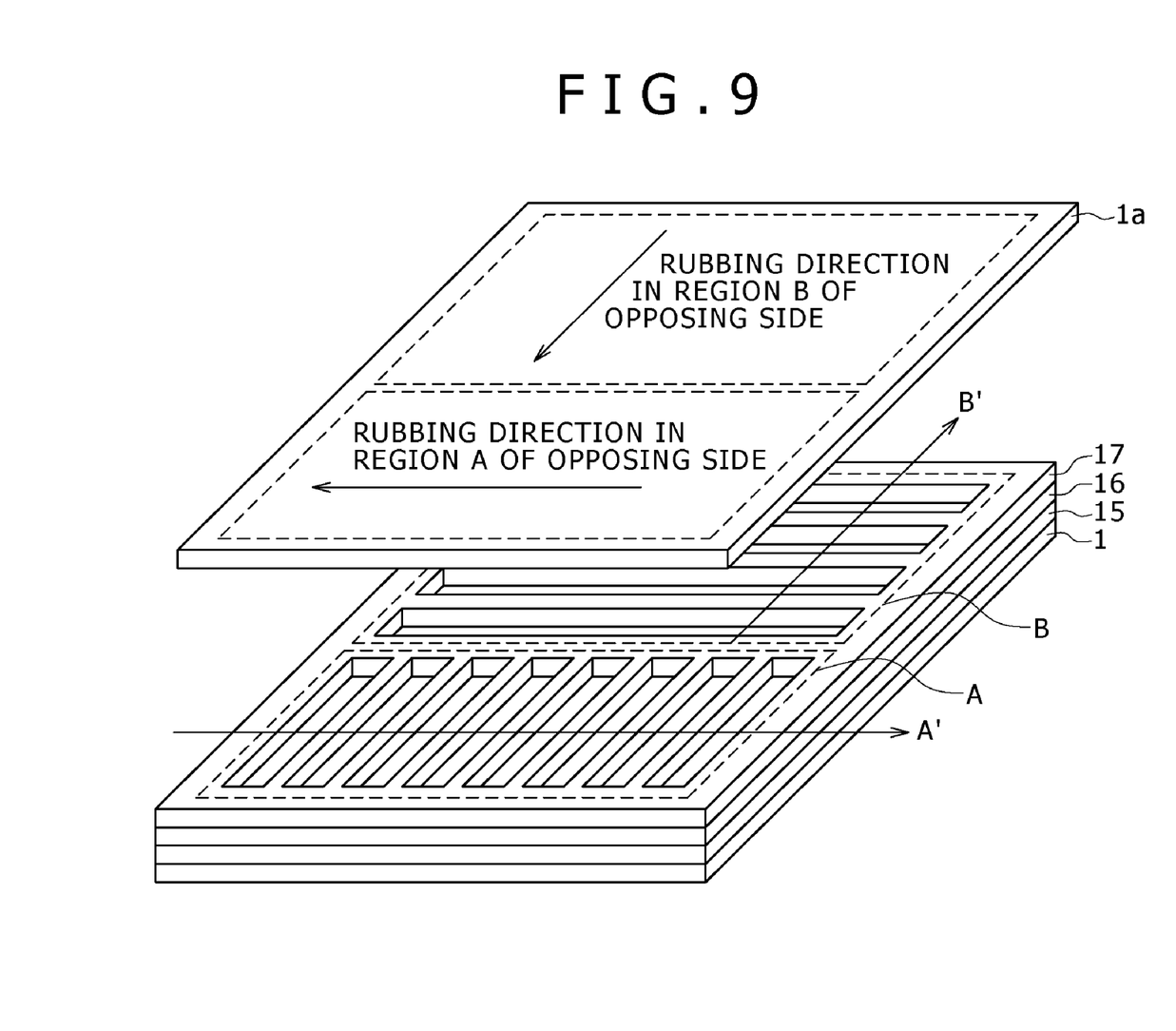
FIG. 9 is a schematic view of a liquid crystal display apparatus used in a sixth embodiment.

Now, a sixth embodiment is described with reference to FIG. 9. When the liquid crystal display apparatus used in the second embodiment was observed, it was found that the scattering strength for scattering light in the extending direction of the comb-tooth-shaped electrode portions was a little weaker than the scattering strength in the perpendicular direction to the extending direction. Therefore, a modified cell of the cell used in the first embodiment was produced such that it had an ITO pattern of the pixel electrode 17 whose comb-tooth-shaped electrode portions have two different extending directions as seen in FIG. 9. The two extending directions are perpendicular to each other. After the formation of the ITO pattern, an orientation film was formed by application and then rubbed in the direction indicated by an arrow mark A' once over an overall area thereof. Thereafter, resist was applied to form a film, and the resist in a region indicated by B was exfoliated by photolithography, whereafter rubbing was carried out in the direction indicated by an arrow mark B'. Then, the resist was exfoliated. Through such divisional orientation steps as just described, the orientation directions in the region A and the region B become perpendicular directions to the extending directions of the corresponding comb-tooth-shaped electrode portions.

On the other hand, also to the opposing electrode 1a, an orientation film was formed by application, and then similar divisional orientation steps were carried out. thereafter, the two substrates 1 and 1a were adhered to each other. In particular, the two substrates 1 and 1a were adhered to each other such that the orientation directions in the region A and the region B had an antiparallel relationship to each other. With the liquid crystal display apparatus having such a configuration as described above, it was confirmed that the direction dependency of the scattering strength when a voltage is applied is reduced.

Figure 10:
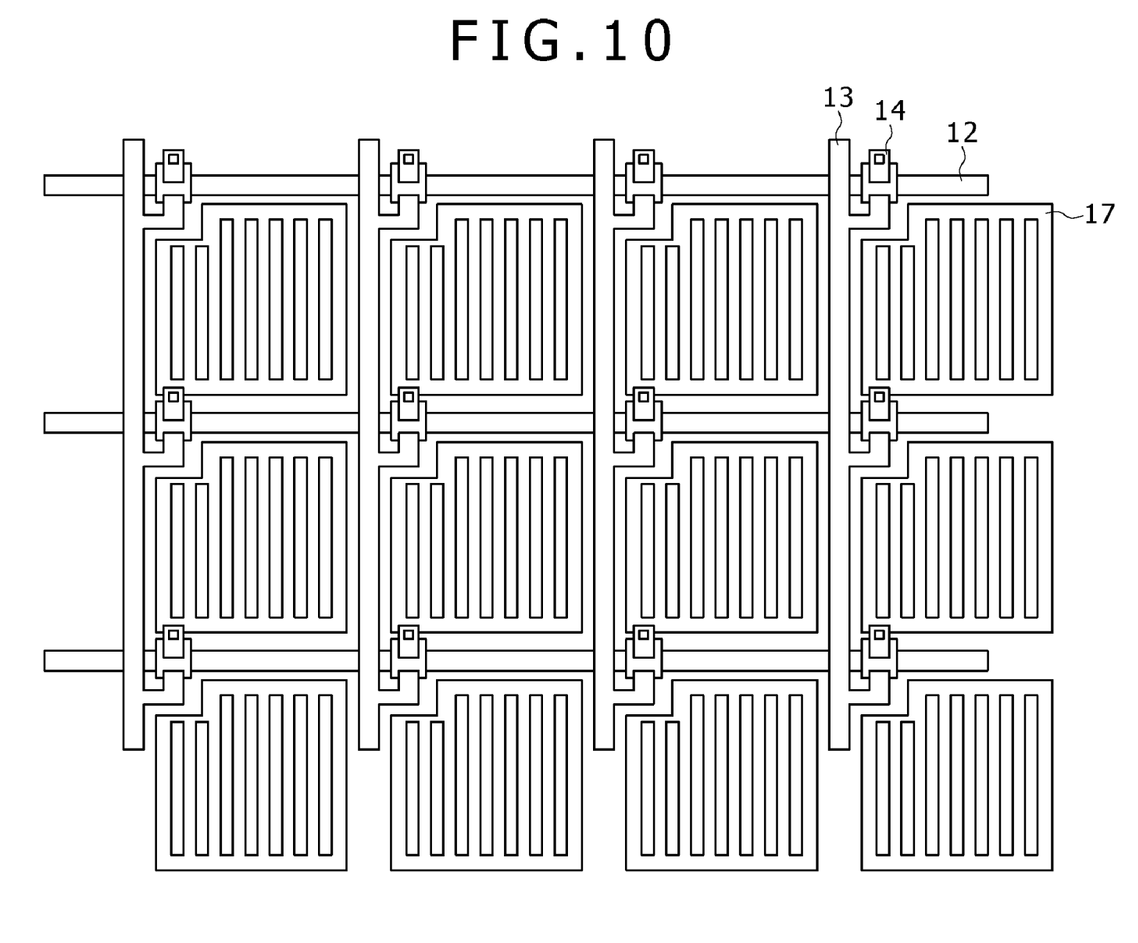
FIG. 10 is a plan view of an active matrix driving substrate of an FFS mode.

While several embodiments of the present invention have been described, they can naturally be applied to such an active matrix apparatus as shown in FIG. 10. Where a liquid crystal display apparatus of the FFS mode is driven by an active matrix method, a plurality of scanning lines 12 and a plurality of signal lines 13 are wired perpendicularly as seen in FIG. 10 and slit-shaped or comp-tooth-shaped pixel electrodes 17 are provided in rows and columns at individual intersecting portions of the scanning lines 12 and signal lines 13 on a driving substrate and are each driven by a TFT 14.

Figure 11A:
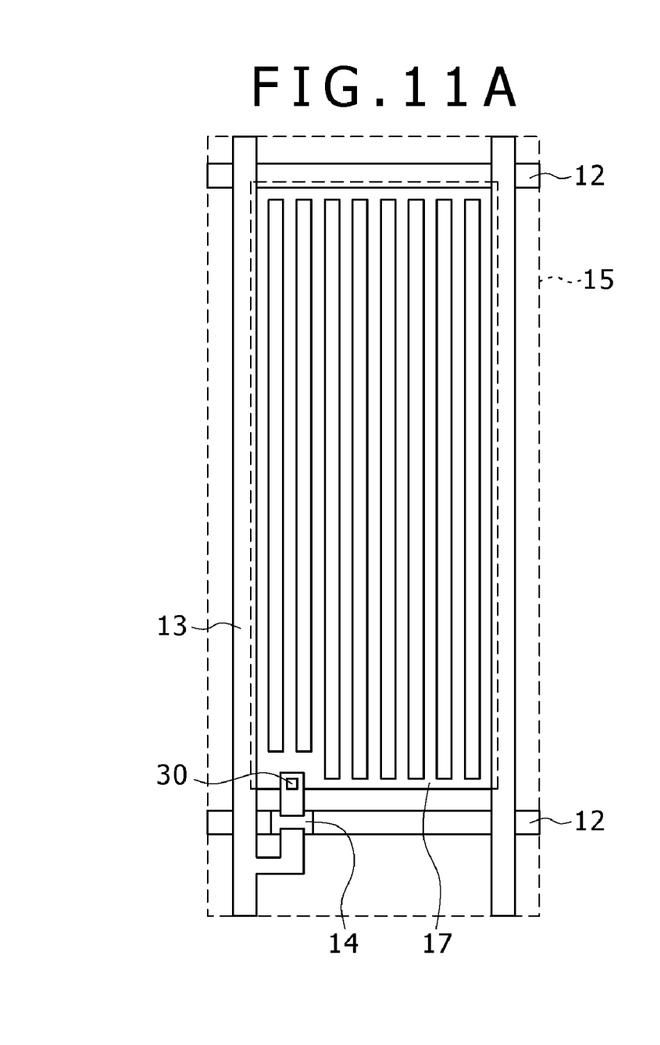
FIGS. 11A and 11B are a schematic plan view and a schematic sectional view showing one pixel of the active matrix display apparatus shown in FIG. 10, respectively.

FIGS. 11A and 11B show one pixel of the liquid crystal display apparatus of the active matrix transverse electric field type described above with reference to FIG. 10. As seen in FIG. 11a, the scanning lines 12 and the signal lines 13 are formed on a substrate of the liquid crystal display apparatus such that they extend along the directions of a row and a column, respectively. The scanning lines 12 and the signal lines 13 intersect with each other like a lattice structure, and one lattice corresponds to just one pixel. Each pixel has a common electrode 15 and a pixel electrode 17 formed therein. The pixel electrode 17 is disposed on the common electrode 15 with an interlayer insulating film interposed therebetween and has a comb-shaped pattern. A voltage is applied between the pixel electrode 17 and the common electrode 15 to apply a transverse electric field to the liquid crystal to switch the orientation direction of the liquid crystal. In order to apply a voltage to the pixel electrode 17, a thin film transistor (TFT) 14 is formed for each pixel. The thin film transistor (TFT) 14 is connected at the gate electrode thereof to the corresponding scanning line 12, at the source electrode thereof to the corresponding signal line 13 and at the drain electrode thereof to the corresponding pixel electrode 17 through a contact 30. The common electrodes 15 of the pixels are connected to a common potential.

Figure 11B:
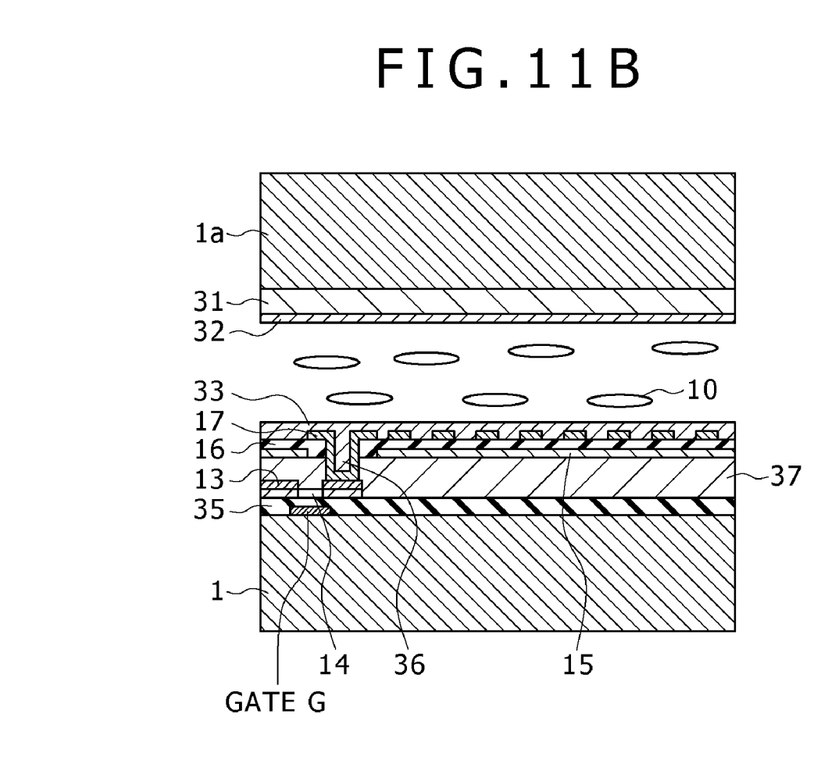

Referring to FIG. 11B, the liquid crystal display apparatus includes a pair of substrates 1 and 1a disposed in an opposing relationship to each other with a predetermined gap left therebetween and liquid crystal layer 10 disposed in the gap. A color filter 31 and an orientation film 32 are layered on an inner face of the transparent substrate 1a.

The lower transparent substrate 1 has a common electrode 15 described hereinabove, a pixel electrode 17 having a comb-shaped pattern and disposed on the common electrode 15 with an insulating film 16 interpose therebetween, an orientation film or orientation layer 33 disposed on the pixel electrode 17 for orienting the liquid crystal layer 10, and switching means for applying a voltage between the pixel electrode 17 and the common electrode 15 to vary the orientation direction of the liquid crystal layer 10. In the embodiment shown in FIG. 11B, the switching means is the thin film transistor thin film transistor (TFT) 14 as described above. The thin film transistor (TFT) 14 is covered with an interlayer insulating film 37 and is connected to the pixel electrode 17 through a contact hole 36. More particularly, the thin film transistor 14 is connected at the gate G thereof to the scanning line 12 not shown. A semiconductor thin film is formed on the gate G with a gate insulating film 35 interposed therebetween and is divided into a source and a drain. The source is connected to the signal line 13 as described hereinabove, and the drain is connected to the pixel electrode 17 through the contact hole 36.

If a voltage according to an image signal is applied to the pixel electrode 17 with respect to the common electrode 15 connected to the common potential, then a transverse electric field is applied to the liquid crystal layer 10. Thereupon, the orientation state of the liquid crystal layer 10 is switched to place the liquid crystal layer 10 into a light scattering state so that the transmission factor of the liquid crystal is modulated in response to the image signal. It is to be noted that the transverse electric field method is not limited to the FFS mode wherein the common electrode 15 and the pixel electrode 17 are isolated from each other by an insulating film, but may have the IPS mode wherein comb-shaped electrodes are combined in the same plane or some other mode. Basically, the transverse electric field method includes all modes wherein switching occurs within a substrate plane.

As described above, the liquid crystal display apparatus according to the embodiment of the present invention is characterized in that it includes a pair of substrates 1 and 1a joined together with a predetermined gap left therebetween, a liquid crystal layer 10 held in the gap, and electrode 17 formed on at least one of the substrates 1 and 1a for applying a transverse electric field parallel to the substrate 1 to the liquid crystal layer 10, and in a state wherein the transverse electric field is not applied, the liquid crystal layer 10 exhibits a light transmitting state, but in another state wherein the transverse electric field is applied, the liquid crystal layer 10 exhibits a light scattering state. In one form, the liquid crystal layer 10 is made of a liquid crystal material having positive dielectric anisotropy, and is oriented in a direction parallel to the transverse electric field in the state wherein the transverse electric field is not applied. In another form, the liquid crystal layer 10 is made of a liquid crystal material having negative dielectric anisotropy, and is oriented in a direction perpendicular to the transverse electric field in the state wherein the transverse electric field is not applied.

As the most basic form, the liquid crystal display apparatus of the present invention includes a pair of substrates 1 and 1a joined together with a predetermined gap left therebetween, a liquid crystal layer 10 held in the gap, and electrodes 15 and 17 formed on at least one 1 of the substrates 1 and 1a for applying a transverse electric field in a predetermined direction to the liquid crystal layer 10, and the liquid crystal layer 10 is made of a liquid crystal material having positive dielectric anisotropy and oriented in a direction parallel to the electric field in a state wherein the electric field is not applied. Or, the liquid crystal layer 10 is made of a liquid crystal material having negative dielectric anisotropy and oriented in a direction perpendicular to the electric field in a state wherein the electric field is not applied.

While a preferred embodiment of the present invention has been described using specific terms, such description is for illustrative purposes only, and it is to be understood that changes and variations may be made without departing from the spirit or scope of the following claims.

What is claimed is:

1. A liquid crystal apparatus, comprising:
a pair of substrates; and
a liquid crystal layer held between said substrates, said liquid crystal layer having positive dielectric anisotropy, the liquid crystal of said liquid crystal layer exhibiting, when no voltage is applied thereto, an orientation direction parallel to a transverse electric field which is generated when a voltage is applied to said liquid crystal layer.

2. The liquid crystal apparatus according to claim 1, wherein the transverse electric field is a fringe field.

3. The liquid crystal apparatus according to claim 2, wherein:
a common electrode and a comb-shaped pixel electrode are disposed in an isolated relationship from each other on that face of at least one of said substrates which is positioned adjacent to said liquid crystal layer so as to generate a fringe field, and
the orientation direction of the liquid crystal when no voltage is applied is perpendicular to an extending direction of said comb-shaped pixel electrode.

4. The liquid crystal apparatus according to claim 3, wherein said common electrode has a light reflecting property or a low light reflecting property.

5. The liquid crystal apparatus according to claim 1, further comprising a light reflecting plate or a black plate disposed on that face of one of said substrates which is remote from said liquid crystal layer.

6. The liquid crystal apparatus according to claim 1, further comprising a light reflecting member or a black member disposed on that face of one of said substrates which is adjacent to said liquid crystal layer.

7. A liquid crystal apparatus, comprising:
a pair of substrates; and
a liquid crystal layer held between said substrates, said liquid crystal layer having negative dielectric anisotropy, the liquid crystal of said liquid crystal layer exhibiting, when no voltage is applied thereto, an orientation direction perpendicular to a transverse electric field which is generated when a voltage is applied to said liquid crystal layer.

8. The liquid crystal apparatus according to claim 7, wherein the transverse electric field is a fringe field.

9. The liquid crystal apparatus according to claim 8, wherein
a common electrode and a comb-shaped pixel electrode are disposed in an isolated relationship from each other on that face of at least one of said substrates which is positioned adjacent to said liquid crystal layer so as to generate a fringe field, and
the orientation direction of the liquid crystal when no voltage is applied is parallel to an extending direction of said comb-shaped pixel electrode.

10. The liquid crystal apparatus according to claim 8, wherein said common electrode has a light reflecting property or a low light reflecting property.

11. The liquid crystal apparatus according to claim 7, further comprising a light reflecting plate or a black plate disposed on that face of one of said substrates which is remote from said liquid crystal layer.

12. The liquid crystal apparatus according to claim 7, further comprising a light reflecting member or a black member disposed on that face of one of said substrates which is adjacent to said liquid crystal layer.

13. A liquid crystal apparatus, comprising:
a pair of substrates joined together with a predetermined gap left therebetween;
a liquid crystal layer held in the gap; and
an electrode formed on at least one of said substrates for applying a transverse electric field parallel to the substrate to said liquid crystal layer,
wherein,
said liquid crystal layer is effective to exhibit, in a state wherein the transverse electric field is not applied, a light transmitting state whereas, in another state wherein the transverse electric field is applied, said liquid crystal layer exhibits a light scattering state.

14. The liquid crystal apparatus according to claim 13, wherein said liquid crystal layer is made of a liquid crystal material having positive dielectric anisotropy and is oriented, in the state wherein the transverse electric field is not applied, to a direction parallel to the transverse electric field generated when the transverse electric field is applied.

15. The liquid crystal apparatus according to claim 13, wherein said liquid crystal layer is made of a liquid crystal material having negative dielectric anisotropy and is oriented, in the state wherein the transverse electric field is not applied, to a direction perpendicular to the transverse electric field generated when the transverse electric field is applied.

16. The liquid crystal apparatus according to claim 13, wherein said electrode applies a fringe field as the transverse electric field to said liquid crystal layer.

17. A liquid crystal apparatus, comprising:
a pair of substrates; and
a liquid crystal layer held between said substrates, said liquid crystal layer having positive dielectric anisotropy; said liquid crystal layer having at least two orientation directions of the liquid crystal in one pixel, the liquid crystal of said liquid crystal layer exhibiting, in each of the regions in which the said liquid crystal layer exhibits the orientation directions, when no voltage is applied thereto, an orientation direction parallel to a transverse electric field which is generated when a voltage is applied to said liquid crystal layer.

18. The liquid crystal apparatus according to claim 17, wherein a common electrode and a comb-shaped pixel electrode having at least two extending directions are disposed in an isolated relationship from each other on that face of at least one of said substrates which is positioned adjacent to said liquid crystal layer so as to generate a fringe field, and the orientation directions, which individually correspond to the extending directions, of the liquid crystal in the regions when no voltage is applied to the liquid crystal in the regions being perpendicular to the extending directions of said comb-shaped pixel electrode.

19. A liquid crystal apparatus, comprising:
a pair of substrates joined together with a predetermined gap left therebetween;
a liquid crystal layer held in the gap; and
an electrode formed on at least one of said substrates for applying an electric field in a predetermined direction to said liquid crystal layer,
wherein,
said liquid crystal layer is made of a liquid crystal material having positive dielectric anisotropy, and
said liquid crystal layer is oriented, in a state wherein the electric field is not applied, in a direction parallel to the electric field.

20. A liquid crystal apparatus, comprising:
a pair of substrates joined together with a predetermined gap left therebetween;
a liquid crystal layer held in the gap; and
an electrode formed on at least one of said substrates for applying an electric field in a predetermined direction to said liquid crystal layer,
wherein,
said liquid crystal layer is made of a liquid crystal material having negative dielectric anisotropy;
said liquid crystal layer is oriented, in a state wherein the electric field is not applied, in a direction perpendicular to the electric field.

* * * * *